April 29, 1969  E. L. MANGAN  3,440,738
STRIP THICKNESS PROFILE GAGE
Filed Aug. 30, 1967  Sheet 1 of 4
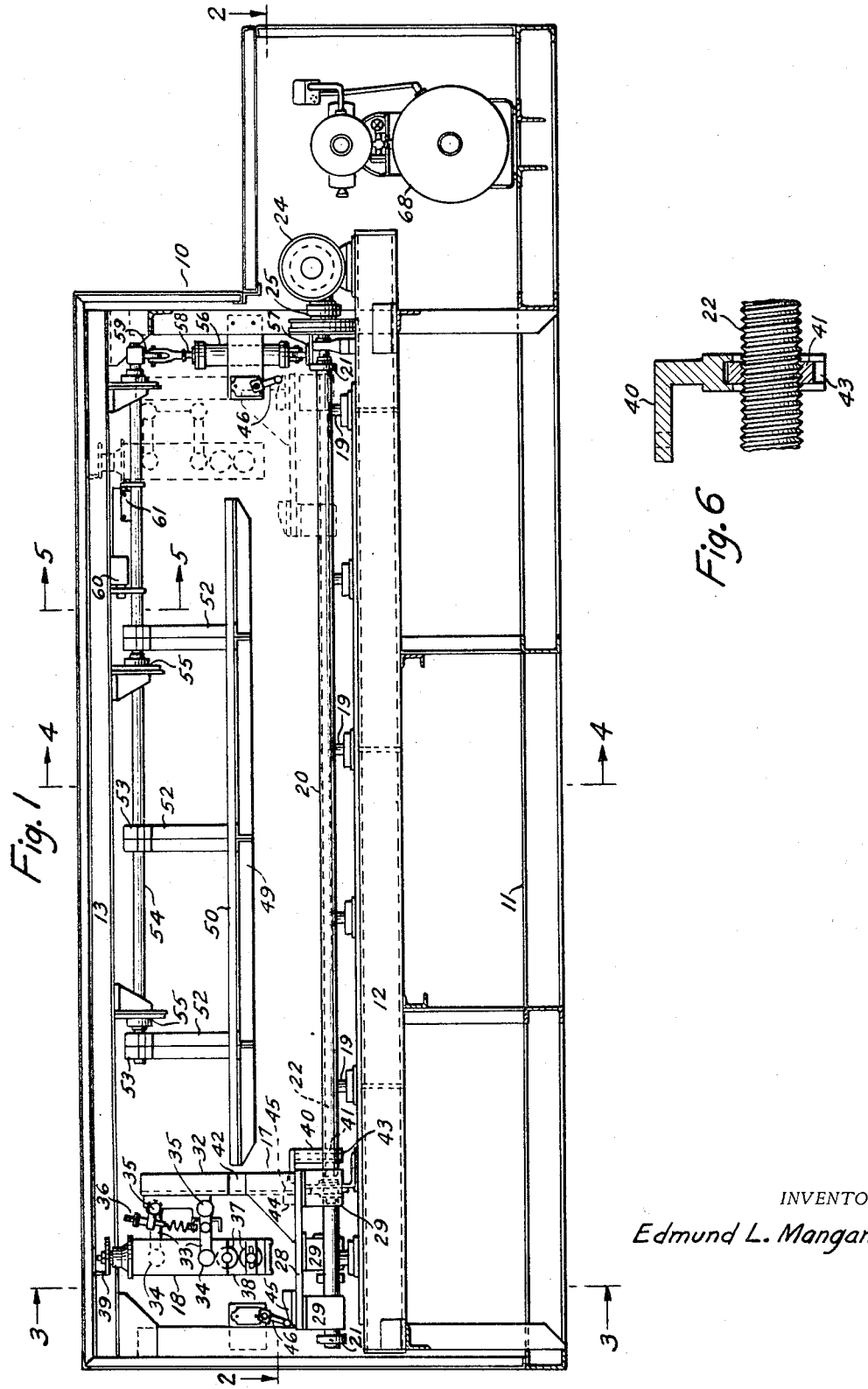
INVENTOR
Edmund L. Mangan

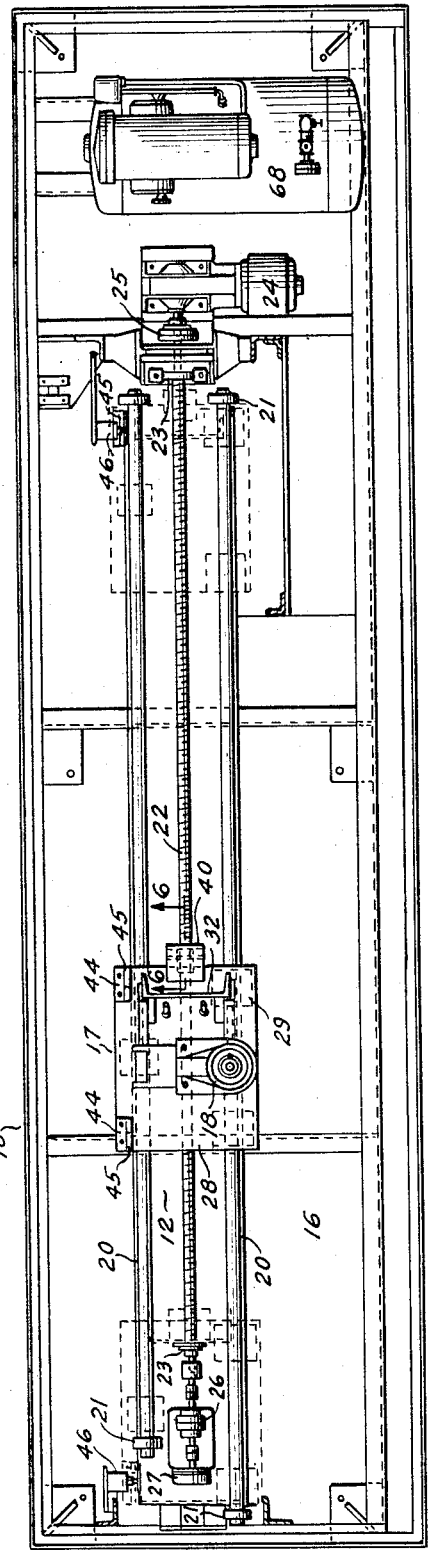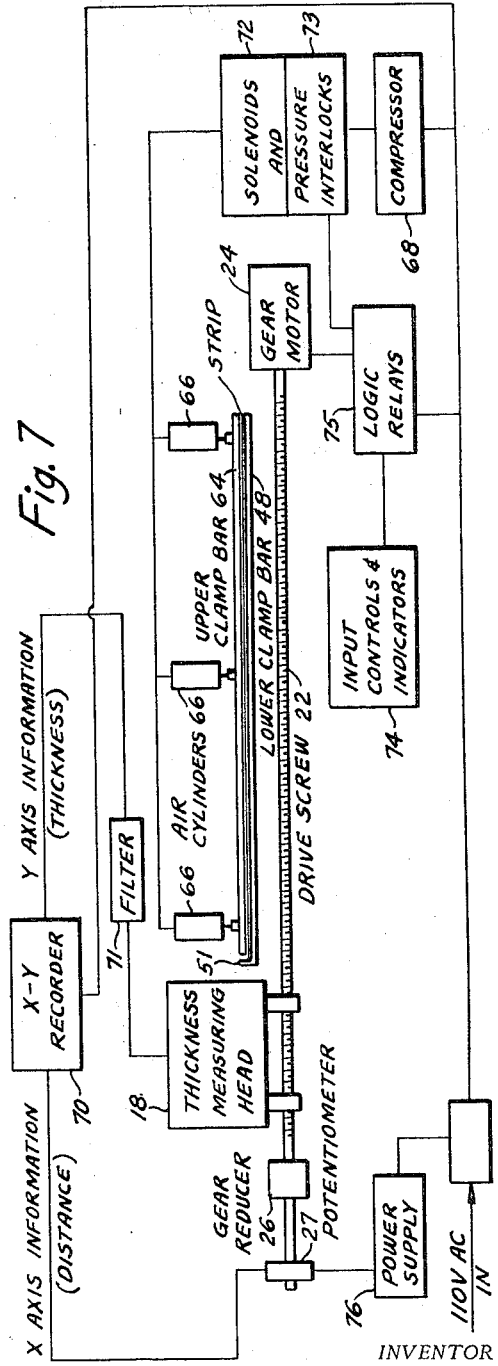

April 29, 1969  E. L. MANGAN  3,440,738
STRIP THICKNESS PROFILE GAGE
Filed Aug. 30, 1967  Sheet 3 of 4
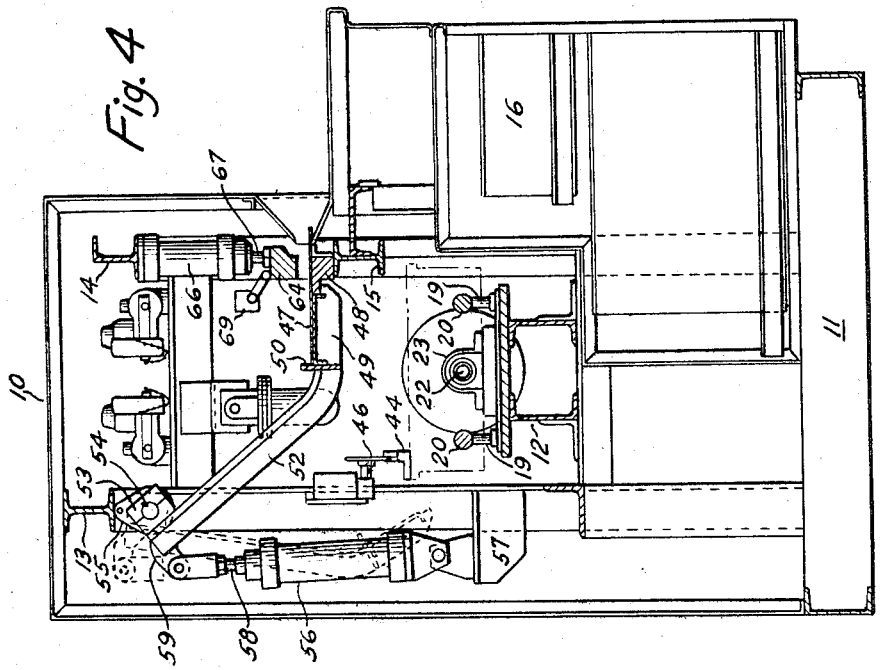
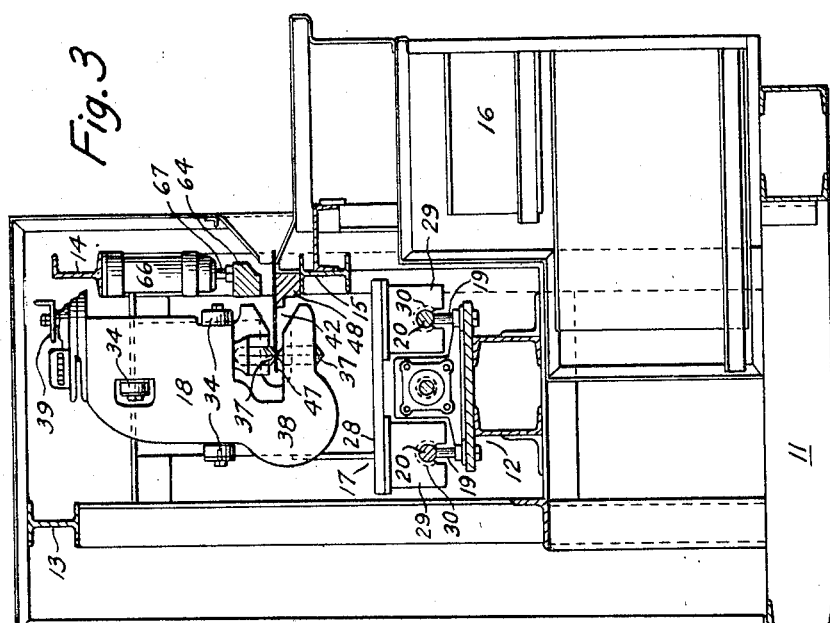
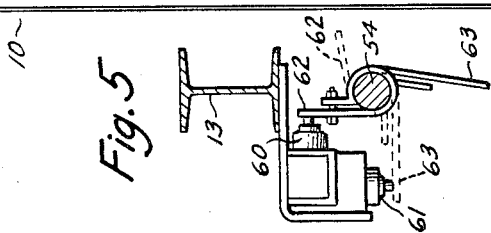
INVENTOR
Edmund L. Mangan

3,440,738
STRIP THICKNESS PROFILE GAGE
Edmund L. Mangan, Bethlehem, Pa., assignor to Bethlehem Steel Corporation, a corporation of Delaware
Filed Aug. 30, 1967, Ser. No. 664,380
Int. Cl. G01b 3/18, 5/08, 3/00
U.S. Cl. 33—174                         9 Claims

ABSTRACT OF THE DISCLOSURE

An apparatus for determining the thickness profile of strip has a movable carriage upon which an electromechanical micrometer is mounted. The strip is clamped in a fixed position such that the movement of the carriage brings the micrometer into contact with the strip. A recorder plots a chart of the thickness vs. length of the strip.

Background of the invention

In the manufacture of strip (or sheet), it is desirable to accurately measure the head to tail (longitudinal) and the edge to edge (transverse) thickness of the strip. Automatic gage control systems, which accurately control the head to tail thickness, are presently in use. However, these systems do not always insure a uniform edge to edge thickness. Furthermore, the prior art gages for measuring edge to edge thickness do not produce accurate measurements near the edges of the strip nor do they provide the desired degree of accuracy. In addition they are not capable of accurate repeat measurements. Accurate edge to edge measurements are used to determine whether the strip has the proper shape for subsequent operations, to detect ridges in the strip, and to enable changes to be made in the manufacturing process.

Summary of the invention

It is an object of this invention to provide an apparatus having a high degree of accuracy for measuring the thickness profile of strip.

It is another object of the invention to provide an apparatus for accurately measuring the thickness profile of strip which is capable of accurate repeat measurements.

It is a further object of this invention to provide a sturdy, accurate and automatic apparatus for measuring and recording the thickness profile of strip.

The foregoing objects can be obtained by providing an apparatus which positions and clamps the strip in a fixed position, drives a carriage having an electromechanical micrometer thereon along the surfaces of the strip, and records the thickness and edge to edge length of the strip.

Brief description of the drawings

FIG. 1 is a front elevational view of the apparatus with certain parts omitted for purposes of clarity.

FIG. 2 is a sectional view taken substantially on line 2—2 of FIG. 1.

FIG. 3 is a sectional view taken substantially on line 3—3 of FIG. 1.

FIG. 4 is a sectional view taken substantially on line 4—4 of FIG. 1.

FIG. 5 is an enlarged sectional view taken substantially on line 5—5 of FIG. 1.

FIG. 6 is a sectional view taken substantially on the line 6—6 of FIG. 2.

FIG. 7 is a schematic diagram of the controls circuit.

Description of the preferred embodiment

Figure 8:
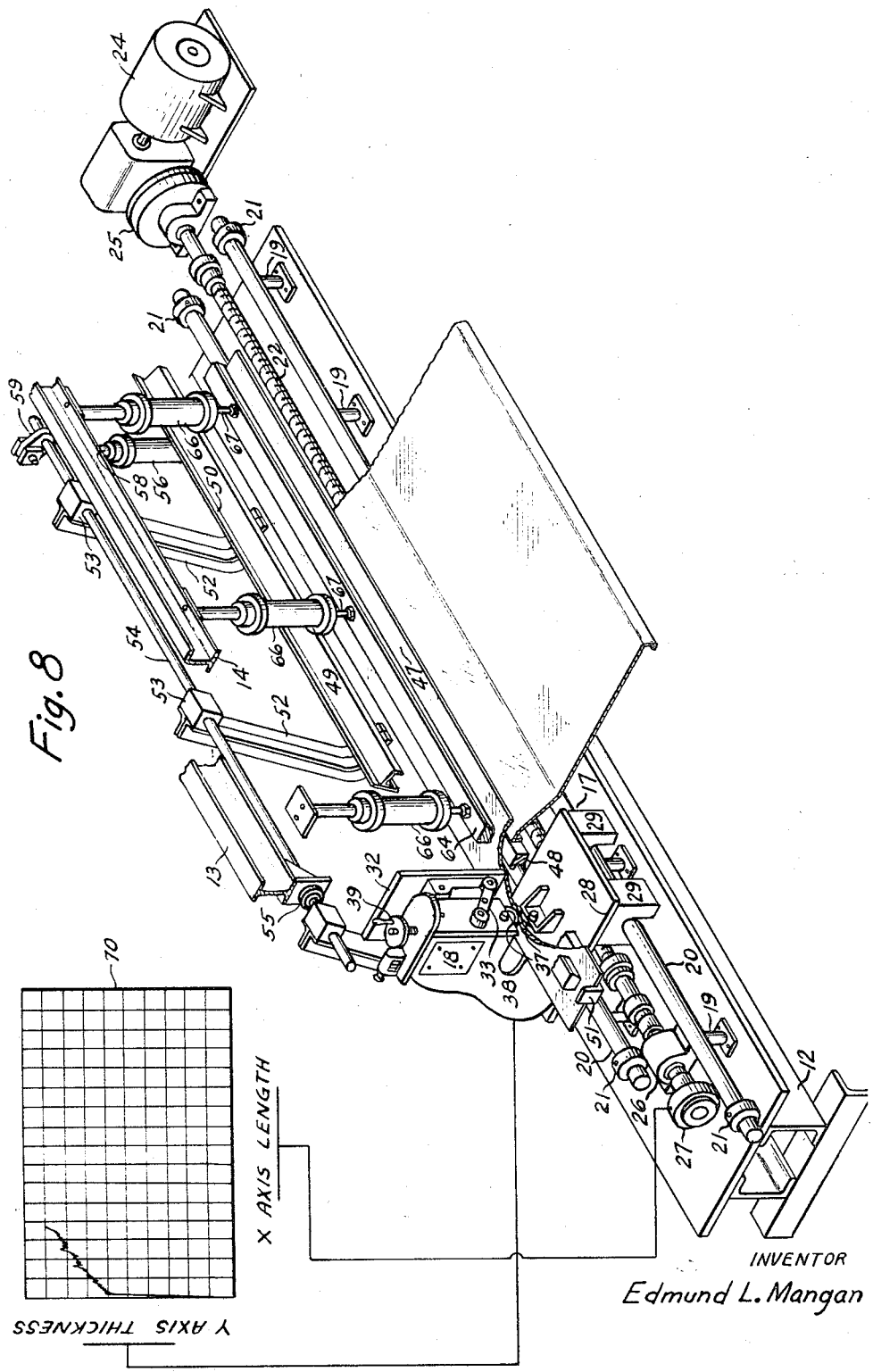
FIG. 8 is a perspective view of the apparatus with certain parts omitted for purposes of clarity.

It should be understood that the term "strip" includes metallic and non-metallic material having a length substantially greater than its thickness.

Although the apparatus of this invention was primarily designed for making profile measurements on an edge to edge specimen of strip cut from a coil of steel strip, it will be apparent that the apparatus can be used for making such measurements on other strip specimens.

Referring to the drawings:

Broadly, the apparatus comprises a frame, a carriage assembly, strip positioning means, strip clamping means, and controls.

Frame

As best shown in FIGS. 3 and 4, the frame 10 comprises a plurality of structural members and panel members fastened together to form a rigid support for the other elements of the apparatus. In the following description, front is used to indicate the portion of the apparatus at the right of FIGS. 3 and 4, and rear is used to indicate the portion of the apparatus at the left of FIGS. 3 and 4. The frame 10 includes the following members: an elongated base 11 adapted to be anchored to a foundation (not shown), an elongated horizontal carriage support 12 having a width less than the base 11 and positioned above the base 11, a support beam 13 positioned to the rear of the apparatus and adjacent the top of the frame 10, a cylinder support beam 14 positioned to the front of the apparatus and adjacent the top of the frame 10, and a clamping bar support beam 15 positioned directly below the cylinder support beam 14 and at a higher elevation than the carriage support 12. These members are connected together by transverse and vertical structural members. As shown in FIGS. 3 and 4, the lower front of the apparatus includes a cabinet area 16 having a number of drawers. Part of the cabinet area is used to house the controls for the apparatus.

Carriage assembly

The carriage assembly comprises a carriage 17, having an electromechanical micrometer 18 pivotally mounted thereon, and means to drive and guide the carriage 17.

As best shown in FIGS. 1 and 3, mounted on the carriage support 12 are two longitudinal rows of stools 19. Each row includes six stools 19 equally spaced along the carriage support 12. A carriage guide rod 20 is supported by each row of stools 19. The upper surface of each stool 19 is concave to mate with the cylindrical surface of the carriage guide rod 20. Bolts in threaded engagement with the carriage guide rod are used to fasten the stools 19 and carriage guide rods 20 to the carriage support 12. A retaining collar 21 is fixed to each end of each carriage guide rod 20 to limit the movement of carriage 17.

As best shown in FIG. 2, a drive screw 22 extends between and parallel to the two carriage guide rods 20. The drive screw 22 is rotatably attached to the carriage support 12 by pillow blocks 23. One end of the drive screw 22 is driven by a gear motor 24 through a controlled torque coupling 25. The other end of the drive screw 22 is connected to a gear reducer 26. The output shaft of the gear reducer 26 is connected to a potentiometer 27.

With reference to FIGS. 1 and 3, depending from the horizontal portion 28 of carriage 17 are three slotted bushing housings 29. Two bushing housings 29 extend over the carriage guide rod 20 adjacent the front of the apparatus and one extends over the carriage guide rod 20 adjacent the rear of the apparatus. Within each of the bushing housings 29 is a slotted ball bushing 30. The slot in the bushing housing 29 and bushing 30 allows the bushings and housings to slide past the stools 19. The bushing 30 encircles more than one half of the circumference of its carriage guide rod 20 to prevent any appreciable vertical movement of the carriage 17.

An electromechanical micrometer 18 is mounted on the vertical portion 32 of the carriage 17 by pivot arms 33 which are attached to the micrometer 18 by pivot pins 34 and to the vertical portion 32 by pivot pins 35. A spring counterbalance unit 36 resiliently supports the micrometer 18 for limited pivotal movement in a vertical direction.

Electromechanical micrometer 18 includes a pair of vertically spaced rolls 37 rotatably mounted in C frame portion 38. The opening of the C frame portion 38 is aligned with a horizontal slot 42 in the vertical portion 32 of carriage 17. Calibrated hand wheel 39 is adapted to vary the vertical spacing between the contact rolls 37. The electromechanical micrometer 18 is of a well known type and produces an electrical signal in response to a change in spacing between the contact rolls 37.

As best shown in FIG. 6, an angle bracket 40 having a vertical slot 43 depends from the carriage. Located within the vertical slot 43 is a floating nut 41 which is in threaded engagement with drive screw 22. Floating nut 41 is not able to rotate or move horizontally within the vertical slot 43 but may move a limited distance in a vertical direction to allow for any slight misalignment between the guide rods 20 and drive screw 22. Thus rotation of gear motor 24 causes the carriage 17 to be moved along the carriage guide rods 20.

A bracket 44 is mounted at each end of the carriage 17. Each bracket 44 includes a sloping cam surface 45. The brackets 44 are aligned with limit switches 46 attached to the frame 10 adjacent each end of the drive screw 22. The limit switches 46 are connected to the gear motor 24 through the logic relays, hereinafter described. Thus, when the cam surface 45 of a bracket 44 contacts its respective limit switch 46, the rotation of the drive screw 22 and movement of the carriage 17 is either stopped or reversed, as hereinafter described.

Strip positioning means

In order that a repeat measurement of the same cross section of the strip may be obtained after the strip has been measured and removed from the machine, it is necessary to accurately position and support the strip at a fixed position within the apparatus.

As best shown in FIGS. 4 and 8, a strip 47, having a length approximately equal to or less than the length of lower clamping bar 48 is placed on the lower clamping bar 48 which is attached to the top of clamping bar support beam 15. The strip 47 is then moved rearwardly on the upper horizontal surface of pivoted support 49 and lower clamping bar 48 until the edge of the strip 47 is in contact with the stop 50 of pivoted support 49. Next, the strip 47 is moved into contact with stop 51 of lower clamping bar 48. At this time, the strip is properly positioned and ready to be clamped by the strip clamping means, as hereinafter described.

As best shown in FIGS. 4 and 8, pivoted support 49 includes integral arm portions 52 having bearing brackets 53 keyed to shaft 54. Shaft 54 is rotatably supported by bearing brackets 55 attached to support beam 13. An air cylinder 56 has its lower end pivotally attached to bracket 57 which is secured to frame 10. Piston rod 58 of air cylinder 56 is pivotally attached to arm 59 which is keyed to shaft 54. Thus, the movement of piston rod 58 of air cylinder 56 causes shaft 54 to rotate a limited amount and pivoted support 49 to move about shaft 54, as shown by the solid and phantom lines of FIG. 4, indicating the pivoted support 49.

As shown in FIG. 5, switches 60, 61 are attached to the lower surface of support beam 13 adjacent shaft 54 and transmit an electrical signal to the input controls and indicators and the logic relays, as hereinafter described. Attached to shaft 54 for rotation therewith are switch operating arms 62, 63. When the pivoted support 49 is in a position to support strip 47 as shown by the solid lines in FIG. 4, arm 62 actuates switch 60. When the pivoted support is rotated to a substantially vertical position as shown by the dotted lines in FIG. 4, arm 63 actuates switch 61.

Strip clamping means

In order to accurately measure the strip 47 it is necessary that strip 47 be firmly held in the position set forth above.

With reference to FIGS. 3, 4 and 8, the strip 47 clamping means comprises an upper clamping bar 64, means to actuate the upper clamping bar and a lower clamping bar 48. A plurality of air cylinders 66 are connected to and depend from cylinder support beam 14. Each air cylinder 66 has its piston rod 67 connected to the upper clamping bar 64. Thus, when the air cylinders 66 are actuated by air compressor unit 68 (FIGS. 1 and 2), the upper clamping bar 64 will move in a vertical direction.

The lower clamping bar 48 is positioned directly below the upper clamping bar 64 and is attached to the clamping bar support beams 15. As shown in FIG. 8, the upper and lower clamping bars 64 and 48, respectively, are in continuous longitudinal contact with the strip 47 throughout substantially its entire length with a portion of the strip 47 extending rearwardly in the path of travel of the electromechanical micrometer 18.

As shown in FIG. 4, a switch 69 is actuated by the movement of upper clamping bar 64 and sends an electrical signal to indicate the positions of the upper clamping bar 64.

Controls circuit

Referring to FIG. 7, X–Y recorder 70 receives the length or X signal from the potentiometer 27 connected to the gear reducer 26 which is driven by drive screw 22. The thickness or Y signal for the recorder 70 is obtained from the electromechanical micrometer 18 and passes through filter 71. Filter 71 eliminates 60 and 120 cycle A.C. current components that are many times larger than the actual thickness signal. These 60 and 120 cycle current components are inherent in the electrical output of most electromechanical micrometers and for low recorder speeds may be tolerated. However, at the high recorder speed of this invention, the 60 and 120 cycle current components must be eliminated so that only a D.C. signal proportional to the strip thickness is supplied to the recorder 70.

Air pressure for air cylinders 56 and 66 is supplied by air compressor unit 68. Solenoids 72 and pressure interlocks 73 are located in the line between the compressor unit 68 and air cylinders 56 and 66. The solenoids 72 allow air to pass between the air cylinders 56 and 66 and the compressor unit 68 and receive a signal from the input controls and indicators 74 through the logic relays 75. The pressure interlocks 73 provide a signal to the logic relays 75 to indicate that the proper air pressure has been supplied to the air cylinders 56 and 66.

The input controls and indicators 74 operate through the logic relays 75 and include an on-off push button, an indicator light to show that the proper air pressure is available for the air cylinders 56 and 66, an upper clamping bar 64 close push button which initiates closing of the upper clamping bar 64, an upper clamping bar open push button which initiates the opening of the upper clamping bar, an indicator light to show that the pivoted support 49 is in a substantially vertical position and clear of the path of movement of the carriage 17, a carriage forward push button to initiate movement of the carriage 17 from the position shown in solid lines in FIG. 1 to the position shown in dotted lines (this direction of movement is called forward and the opposite direction of movement is called reverse), a carriage reverse push button, and a carriage stop push button.

The logic relays 75 operate the solenoids 72 and gear motor 24 and are interlocked so that the proper sequence of operations occurs, as hereinafter described.

The X–Y recorder 70 plots a chart showing the thickness of the strip vs. the strip length. The recorder 70 comprises a sheet of graph paper and a recorder pen which traces a chart in response to the electrical D.C. inputs supplied by the potentiometer 27 and electromechanical micrometer 18. The recorder pen traces only as the carriage moves forward and, in so doing, all recordings are referenced from the end of the sample in contact with the stop 51 on lower clamping bar 48. At other times, the recorder pen is lifted from the graph paper by a signal from the logic relays 75. The power supply 76 provides the proper D.C. voltage to the potentiometer 27. The power supply 76 includes means to adjust the voltage so that the signal from the potentiometer 27 is compatible with the X axis sensitivity of the recorder 70.

The power input for all electrical components of the apparatus originates at the 110 volt A.C. source.

The above description of the controls circuit is not to be construed as restricted to the particular elements described. A number of other equivalent electrical elements may be used. For example, solid state switching devices could be used in place of relays.

*Operation*

After the strip 47 has been properly positioned between the upper and lower clamping bars 64, 48, as described above, and the calibrated hand wheel 39 of the electromechanical micrometer 18 is set at the nominal thickness of the strip 47, the following sequence of operations takes place:

(1) The power on push button is depressed. This starts the compressor of air compressor unit 68. The compressor runs until the air pressure in the supply tank is sufficient to operate the air cylinders 56, 66 and the pressure interlocks 73.

(2) The upper clamping bar 64 close push button is depressed. Through the logic relays 75, this operates air cylinders 66 which cause the upper clamping bar 64 to move downwardly and clamp the strip 47 in the proper position.

(3) The downward movement of the upper clamping bar 64 actuates switch 69 which initiates, through the logic relays 75, the movement of air cylinder 56 causing shaft 54 to rotate and move pivoted support 49 downwardly and out of the path of movement of the carriage 17.

(4) After the above sequence of operations, an indicator light, operated by arm 63 contacting limit switch 61, shows that the strip 47 is properly clamped and the pivoted support 49 is clear of the path of movement of the carriage 17.

(5) The carriage forward button is depressed. This initiates the forward movement of the carriage 17 which bring the electromechanical micrometer rolls 37 into contact with the strip 47.

(6) As the carriage 17 moves forward, the recorder pen contacts the graph paper. As the electromechanical micrometer rolls 37 move along the surface of the strip 47, the recorder pen traces an X (length) vs. Y (thickness) chart.

(7) When the carriage 17 reaches the end of its forward movement, cam surface 45 contacts switch 46 as shown in dotted lines in FIG. 1. This stops the gear motor 24 and lifts the recorder pen from the graph paper.

(8) The carriage reverse push button is depressed. This returns the carriage to its original position, as shown in solid lines in FIG. 1, and cam surface 45 contacts switch 46 which stops gear motor 24.

(9) The upper clamping bar open push button is depressed. This initiates, through the logic relays 75, the operation of air cylinder 56 which rotates shaft 54 which moves pivoted support 49 to the position shown in solid lines in FIG. 4. At this time, arm 62 contacts switch 60 (FIG. 5) which causes solenoids 72 to actuate air cylinders 66 and raise the upper clamping bar 64. The strip 47 may now be removed from the apparatus.

All of the above steps are so interlocked that they must occur in the above order, except that the carriage stop push button may be depressed to stop the carriage 17 at any time.

In actual use, an apparatus constructed according to this invention provided a thickness accuracy of 0.000050 inch and repeat measurements within 0.000010 inch. The apparatus constructed had a thickness range of 0 to 0.300 inch, a length range of 0 to about 75 inches (provided the strip has the proper rigidity), and a carriage speed of 1 inch per second.

What is claimed is:
1. An apparatus for determining the thickness profile of strip comprising:
 (a) longitudinally extending support means to support the surfaces of said strip in a substantially horizontal plane,
 (b) stop means to align a longitudinal and a transverse edge of said strip at a fixed position on said support means,
 (c) means to clamp said strip at said fixed position,
 (d) a carriage adapted to move in the longitudinal direction of said strip,
 (e) an electromechanical micrometer attached to said carriage and including a pair of vertically spaced contact rolls arranged to contact said surfaces of said strip,
 (f) means to move said carriage, and
 (g) electrical recording means responsive to said micrometer and to the movement of the carriage to record the thickness and length of said strip.

2. An apparatus as described in claim 1 wherein the means of subparagraph (a) includes a pivoted support member pivotally mounted for movement into and out of the path of movement of said carriage and a lower clamping bar member.

3. An apparatus as described in claim 1 wherein the means of subparagraph (c) includes a fixed lower clamping bar member in continuous contact with the lower surface of said strip and a movable upper clamping bar member in continuous contact with the upper surface of said strip.

4. An apparatus as described in claim 2 wherein the means of subparagraph (b) includes a stop on said pivoted support member positioned to contact said longitudinal edge of said strip when said pivoted support member is in the path of movement of said carriage and said lower clamping bar member having a stop positioned to contact said transverse edge of said strip.

5. An apparatus as described in claim 4 wherein the means of subparagraph (c) includes said lower clamping bar member and a vertically movable upper clamping bar member.

6. An apparatus as described in claim 5 wherein said carriage of subparagraph (d) is slidably mounted on a pair of longitudinally extending guide rods.

7. An apparatus as described in claim 6 wherein the electromechanical micrometer of subparagraph (e) is pivotally attached to and resiliently supported from said carriage.

8. An apparatus as described in claim 7 wherein the means of subparagraph (f) includes a drive screw in threaded engagement with a nut attached to said carriage and capable of limited vertical movement with respect to said carraige.

9. An apparatus as described in claim 8 wherein said electrical recording means of subparagraph (g) records said thickness and said length only as the carriage moves in the forward longitudinal direction.

References Cited

UNITED STATES PATENTS

| 2,752,687 | 7/1956 | Graham. |
|---|---|---|
| 2,976,615 | 3/1961 | Imshaug. |
| 3,140,545 | 7/1964 | Murtland. |
| 3,304,615 | 2/1967 | Ward et al. |

HARRY N. HAROIAN, *Primary Examiner.*

U.S. Cl. X.R.

33—125, 147